(12) United States Patent  
Kondo et al.

(10) Patent No.: US 8,542,434 B2  
(45) Date of Patent: Sep. 24, 2013

(54) OPTICAL WAVEGUIDE DEVICES AND HARMONIC WAVE GENERATING DEVICES

(75) Inventors: Jungo Kondo, Miyoshi (JP); Tetsuya Ejiri, Kasugai (JP); Yuichi Iwata, Nagoya (JP); Shoichiro Yamaguchi, Ichinomiya (JP); Taku Nishigaki, Gifu (JP)

(73) Assignee: NGK Insulators, Ltd., Nagoya (JP)

(*) Notice: Subject to any disclaimer, the term of this patent is extended or adjusted under 35 U.S.C. 154(b) by 96 days.

(21) Appl. No.: 13/220,015

(22) Filed: Aug. 29, 2011

(65) Prior Publication Data

US 2012/0050842 A1   Mar. 1, 2012

(30) Foreign Application Priority Data

Sep. 1, 2010   (JP) ................. 2010-195866

(51) Int. Cl.  
*G02F 2/02* (2006.01)  
*G02F 1/35* (2006.01)

(52) U.S. Cl.  
USPC .............. 359/328; 385/132; 359/332; 372/22

(58) Field of Classification Search  
USPC .............. 359/326–332; 385/14, 129–132; 372/21–22  
See application file for complete search history.

(56) References Cited

U.S. PATENT DOCUMENTS

| 7,372,621 B2 * | 5/2008 | Yoshino et al. ............... 359/326 |
| 7,373,065 B2 * | 5/2008 | Yamaguchi et al. .......... 385/129 |
| 7,738,161 B2 * | 6/2010 | Yoshino et al. ............... 359/326 |
| 2007/0189689 A1 | 8/2007 | Yamaguchi et al. |

FOREIGN PATENT DOCUMENTS

WO   2006/041172 A1   4/2006

* cited by examiner

*Primary Examiner* — Daniel Petkovsek  
(74) *Attorney, Agent, or Firm* — Burr & Brown (57) ABSTRACT

An optical waveguide device includes a ferroelectric layer having a thickness of 4 μm-7 μm; a supporting body; and an adhesive layer adhering a bottom face of the ferroelectric layer and supporting body. The ferroelectric layer includes a ridge comprising a channel optical waveguide, first and second protuberances on opposite sides of the ridge, inner grooves between the ridge and protuberances, respectively, and outer grooves outside of the protuberances, respectively. The outer groove is deeper than the inner groove. The ridge portion has a width of 6.6 μm-8.5 μm, a distance of an outer edge of the first protuberance and an outer edge of the second protuberance is 8.6 μm-20 μm, the inner groove has a depth of 2.0 μm-2.9 μm, and the outer groove has a depth of 2.5 μm-3.5 μm.

10 Claims, 5 Drawing Sheets

OPTICAL WAVEGUIDE DEVICES AND HARMONIC WAVE GENERATING DEVICES

This application claims the benefit of Japanese Patent Application No. P2010-195866 filed on Sep. 1, 2010, the entirety of which is incorporated by reference.

FIELD OF THE INVENTION

The invention relates to an optical waveguide substrate suitably used for a harmonic wave generating device operating on quasi-phase matched system and an optical modulator.

BACKGROUND ARTS

Recently, it has been studied to develop various devices for light modulation by forming an optical waveguide in various kinds of materials. Such devices are to be used in systems for optical communication, a projector etc. Particularly, so-called ridge shaped optical waveguides can improve the confinement of light to provide a high efficiency of controlling light. The waveguide structure has been thus expected as optical modulators, optical switching devices, wavelength converting devices, or the like.

Non-linear optical crystals, such as lithium niobate or lithium tantalite single crystal, have a high second-order non-linear optical constant. It is thus possible to realize a quasi-phase matched (QPM) type second harmonic generation (SHG) device, by providing a periodic polarization domain inversion structure in the crystal. Further, an SHG device of a high efficiency can be realized by forming a waveguide in the periodic polarization domain inversion structure, and the device finds a wide variety of applications such as optical communication, displays, medical uses, opt-chemical uses, various optical measurements, etc.

Figure 1:
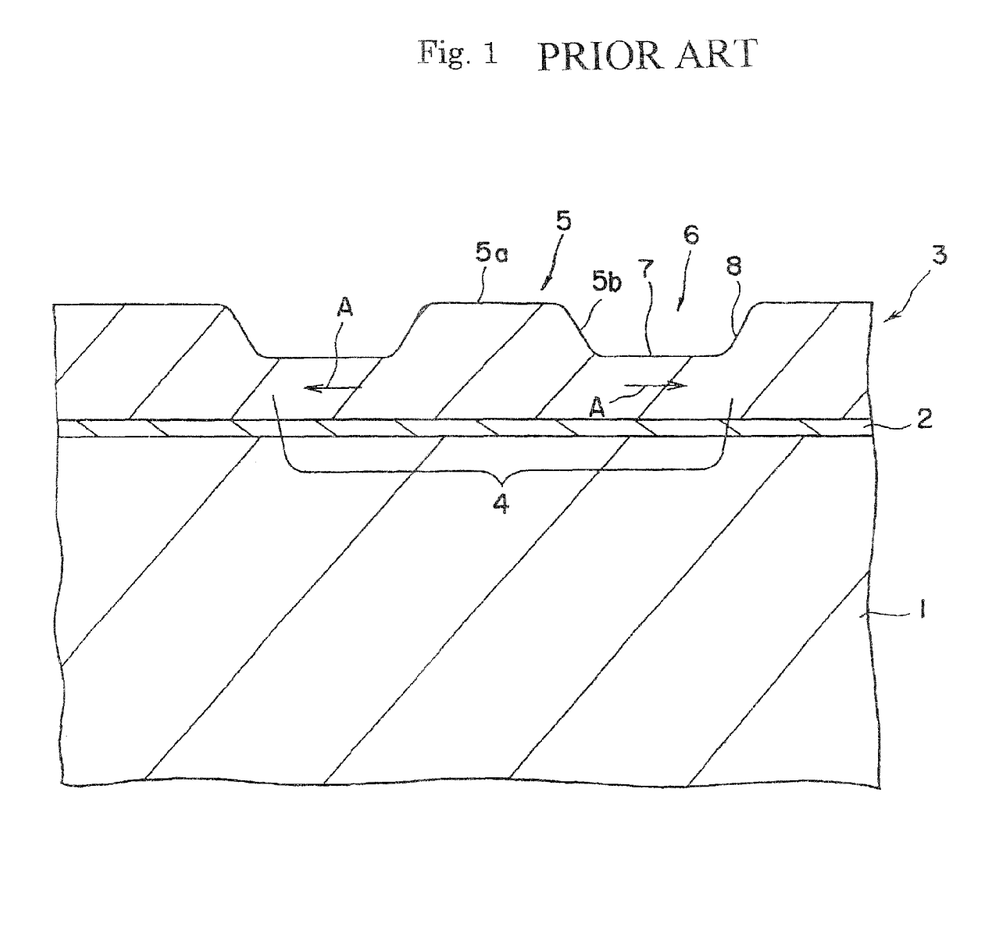
FIG. 1 is a cross sectional view schematically showing an optical wave guide structure according to a prior example.

FIG. 1 shows a structure of forming a channel type optical waveguide in a ridge portion. A layer 3, made of MgO-doped lithium niobate for example and a supporting body 1 are adhered through an adhesive layer 2. A pair of elongate grooves 6, parallel with each other, are formed in the layer 3, so that the grooves 6 form a ridge portion 5. The ridge portion 5 and grooves 6 together form an optical waveguide structure 4, so that the ridge portion 5 functions as a three-dimensional or channel type optical waveguide. According to such optical waveguide structure, it is normally difficult to make side faces 5b and 8 facing the groove 6 perpendicular to an upper face 5a and they are inclined with respect to an axis perpendicular to the upper face 5a. Further, a bottom face 7 of the groove 6 is substantially flat.

However, in the lower side of the bottom face 7, incident light (fundamental wave in the case of a harmonic wave generating device) tends to be leaked as arrow A, so that it becomes difficult to propagate and confine the light in the ridge portion. Further, during the process of forming the ridge portion 5, tipping tends to occur at both edges of the ridge portion 5, resulting in an increase of its optical propagation loss.

In WO 2006/041172A1, the inventors disclosed that a channel type optical waveguide is formed in a ridge portion, protuberances are formed on both sides of the ridge portion, respectively, and grooves are formed between the respective protuberances and ridge portion. It is thereby tried to reduce the tipping at the both edges of the ridge portion and to strengthen the confinement of light in lateral direction to improve the propagation efficiency.

SUMMARY OF THE INVENTION

WO 2006/041172A1 describes that the width of the ridge portion is preferably 6.5 μm or smaller. Under the condition, however, in the case that the groove is made deeper to strengthen the confinement of light, tipping tends to occur at the edges of the ridge portion during the processing of the ridge portion. Therefore, although the mode size can be decreased by making the depth of the ridge portion larger, the density of light becomes larger to make the influences of the tipping considerable, so that the propagation loss may be increased.

An object of the present invention is, in a type of an optical waveguide device having protuberances or step portions on both sides of a ridge portion, to reduce its propagation loss as a whole.

The first invention provides an optical waveguide device comprising:

a ferroelectric layer comprising a ferroelectric material and having a thickness of 4 μm or more and 7 μm or less;

a supporting body; and an adhesive layer adhering a bottom face of the ferroelectric layer and supporting body, wherein the ferroelectric layer comprises a ridge portion comprising a channel type optical waveguide formed therein, a first protuberance provided on a first side of the ridge portion, and a second protuberance provided on a second side of the ridge portion, wherein inner grooves are formed between the ridge portion and the protuberances, respectively;

wherein outer grooves are formed in outside of the protuberances, respectively;

wherein the outer groove is deeper than the inner groove;

wherein the ridge portion has a width W1 of 6.6 μm or larger and 8.5 μm or smaller;

wherein a distance W2 of an outer edge of the first protuberance and an outer edge of the second protuberance is 8.6 μm or larger and 20 μm or smaller;

wherein the inner groove has a depth D1 of 2.0 μm or larger and 2.9 μm or smaller; and wherein the outer groove has a depth D2 of 2.5 μm or larger and 3.5 μm or smaller.

A second invention provides an optical waveguide device comprising:

a ferroelectric layer comprising a ferroelectric material and having a thickness of 4 μm or more and 7 μm or less;

a supporting body; and an adhesive layer adhering a bottom face of the ferroelectric layer and supporting body, wherein the ferroelectric layer comprises a ridge portion comprising a channel type optical waveguide formed therein, a first step portion provided on a first side of the ridge portion and having a height smaller than that of the ridge portion, and a second step portion provided on a second side of the ridge portion and having a height smaller than that of the ridge portion, wherein grooves are formed in outside of the step portions, respectively;

wherein the ridge portion has a width W1 of 6.6 μm or larger and 8.5 μm or smaller;

wherein a distance W2 of an outer edge of the first step portion and an outer edge of the second step portion is 8.6 μm or larger and 20 μm or smaller;

wherein the step portion has a depth D5 of 2.0 μm or larger and 2.9 μm or smaller; and wherein the groove has a depth D4 of 2.5 μm or larger and 3.5 μm or smaller.

According to the present invention, in a type of an optical waveguide device having protuberances or step portions on both sides of the ridge portion, it is possible to reduce the leakage of light exceeding the grooves on the both sides of the ridge portion, to prevent the reduction of the propagation efficiency, and to reduce an increase of the propagation loss due to the tipping at the edges of the ridge portion, so that the propagation loss can be improved as a whole.

EMBODIMENTS OF CARRYING OUT THE INVENTION

Figure 2:
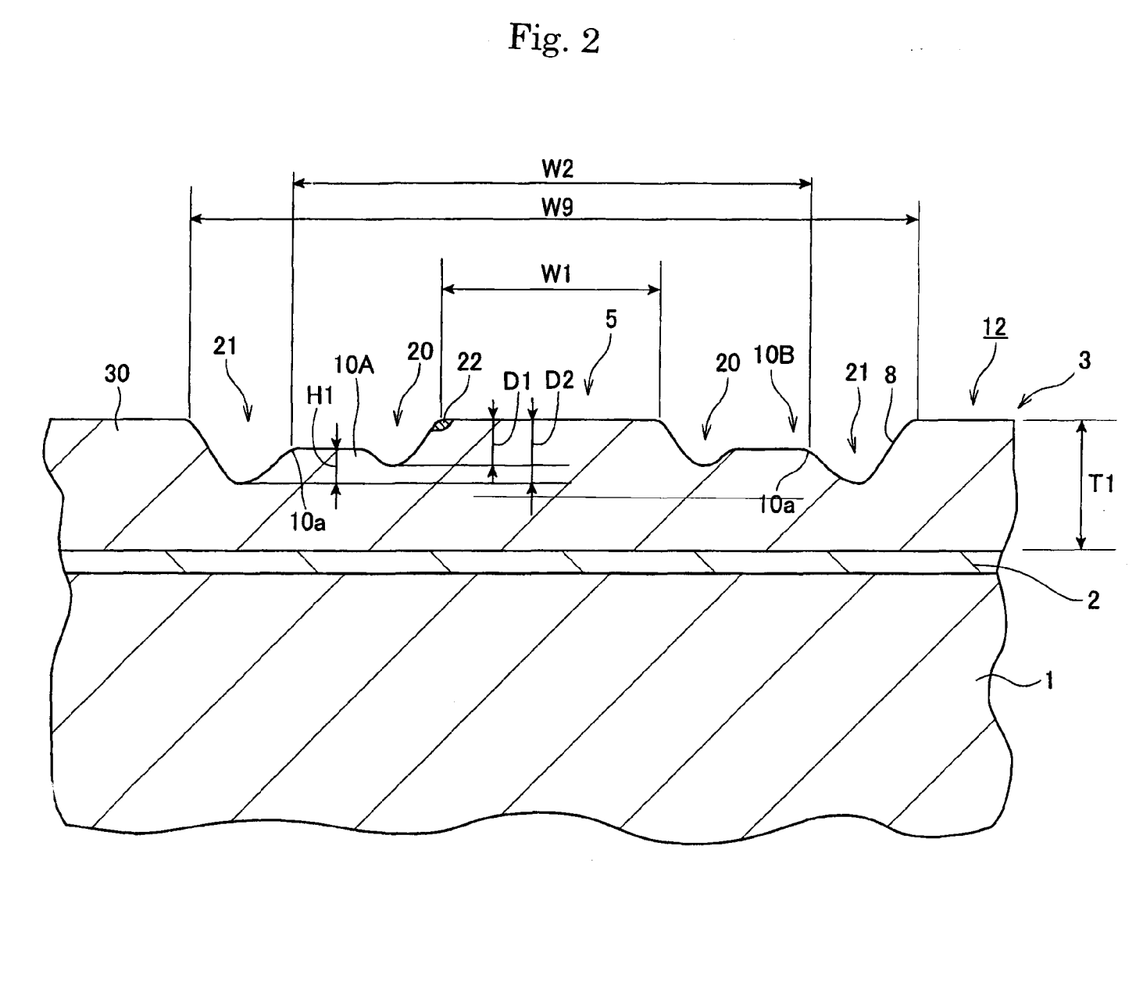
FIG. 2 is a cross sectional view schematically showing an optical waveguide device 12 according to an embodiment of the first invention.

FIG. 2 shows a device 12 according to the first invention.

A ferroelectric layer 3 made of a ferroelectric material is adhered to a supporting body 1 through an adhesive layer 2. Buffer layers not shown may be provided on the surface and bottom sides of the ferroelectric layer 3.

A ridge portion 5 is formed in the ferroelectric layer 3, and a channel type optical waveguide is provided in the ridge portion 5. The optical waveguide is elongated in the direction perpendicular to the paper face shown in FIG. 2. A first protuberance 10A is formed through an inner groove 20 on the left side in the paper face and a second protuberance 10B is formed through an inner groove 20 on the right side in the paper face of the ridge portion 5. Outer grooves 21 are formed on the outsides of the protuberances, respectively, and elongate portions 30 are formed on the outside of the outer grooves 21, respectively.

Figure 3:
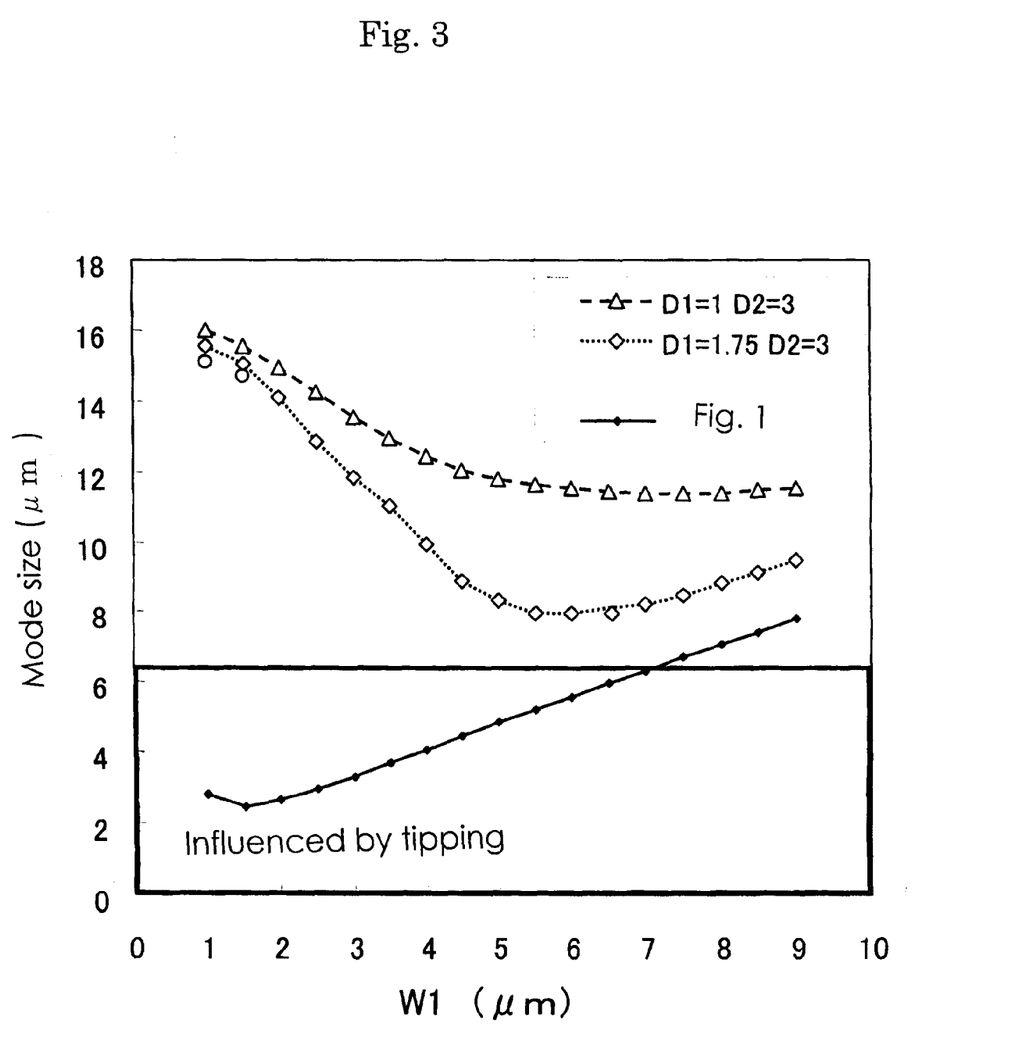
FIG. 3 is a graph exemplifying relationship of a width of the ridge portion and mode size.

The inventors produced structures shown in FIGS. 1 and 2, respectively, and measured the mode size of light and propagation loss. The following findings were thereby obtained. These are described below referring to FIG. 3.

According to the structure shown in FIG. 1, as the width W1 of the ridge portion 5 is made smaller, the mode size becomes smaller. However, when tipping occurs at edges of the ridge portion 5 during the process of forming the ridge portion 5, scattering of light is observed around the tipping to result in deviation of the propagation loss.

On the other hand, according to the structure shown in FIG. 2, for example under the conditions that the depth D1 of the inner groove is 1.0 μm, the depth D2 of the outer groove is 3.0 μm, or that D1 is 1.75 μm and D2 is 3.0 μm, the mode size tends to be considerably increased and leaked laterally in a range where W1 is about 5.5 μm or smaller. Further, the mode size tends to take the minimum value when W1 is 5.5 to 6.5 μm, especially 6.0 to 6.5 μm.

Figure 4:
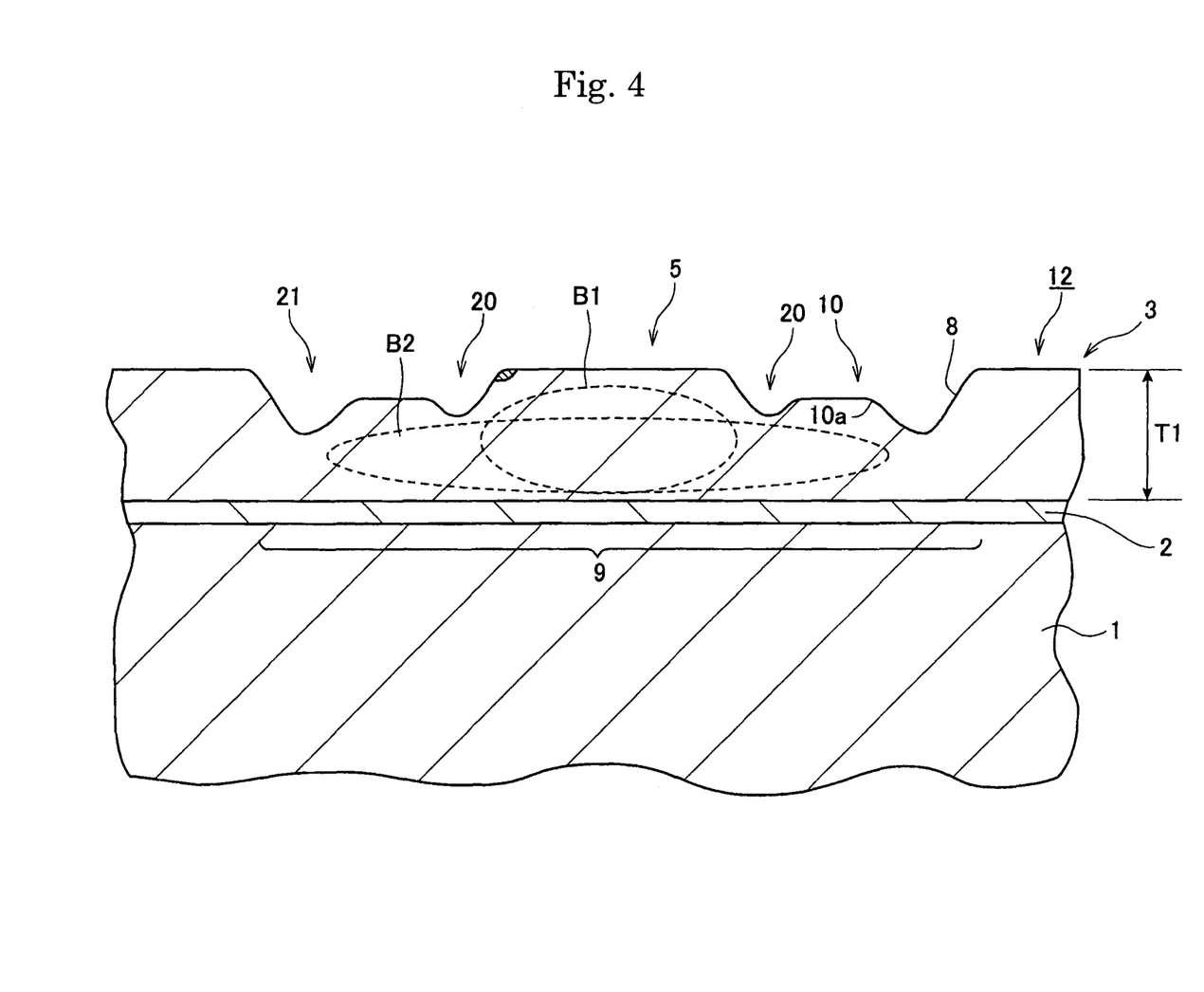
FIG. 4 is a view schematically showing mode size in lateral direction in the device shown in FIG. 2.

The inventors have studied this phenomenon and, as a result, obtained the following findings. That is, the influences of the depth D1 of the inner groove is described first. As schematically shown in FIG. 4, the mode pattern of light in the present structure is regulated by the inner grooves 20 on both sides of the ridge portion 5. In the case that the inner groove 20 is deep, light is confined in the ridge portion 5 as mode B1. On the other hand, in the case that the inner groove 20 is shallow, light could not be confined in the ridge portion 5 and leaked laterally over the inner groove 20 as mode B2.

Next, the width W1 of the ridge will be described below. As to the influences of the ridge width W1, it has been considered that the mode size would be decreased as W1 is smaller as in the case of the structure of FIG. 1. It has thus been considered that, by decreasing the ridge width W1, the confinement could be strengthened, the mode size could be decreased and the propagation loss could be reduced.

On the other hand, actually, it is proved that, as the width W1 of the ridge portion 5 is made smaller, the mode size becomes larger. That is, when W1 is small, the confinement of light in lateral direction is proved to be weak beyond expectations. As shown in FIG. 4, the mode pattern of light propagating in the ridge portion 5 is regulated by the width W1 of the ridge portion 5, and in the case that the width W1 is small, it is considered that the influences of the mode B2 with the mode pattern leaking laterally beyond the inner groove 20 becomes prevalent. Here, it is considered that the optical waveguide with the mode pattern of B2 tends to be coupled with slab mode so as to result in so called cut-off state in which light is irradiated into the whole substrate. Therefore, as W1 is made smaller, the propagation loss tends to become larger.

The inventors then found that the propagation loss can be reduced, by making the width W1 of the ridge portion 5 to 6.6 μm or larger, under the conditions that the depth D1 of the inner groove is made 20 to 2.0 μm or larger and the depth D2 of the outer groove is made 21 to 2.5 μm or larger. In this case, the mode size can be made comparable with the ridge width W1 or less, so that light can be confined in the ridge portion 5 to prevent the cut-off state described above.

That is, it is possible to reduce the influences of the mode B2 of confining light within the ridge portion 5, by setting the inner groove 20 and outer groove 21 as described above. In the case that the inner groove is made deeper than 2.9 μm, however, tipping 22 tends to occur at the edges of the ridge portion 5 so that the propagation loss is increased due to scattering of light. Further, it has been considered that, when the width W1 of the ridge portion 5 is made larger than 6.6 μm, the mode size should become larger as such to weaken the confinement of light, resulting in an increase of the propagation loss. However, although the mode size is increase in fact as W1 is made larger, it is proved that light can be confined within the ridge portions so that it is hardly observed the contribution of the mode B2 susceptible to the coupling with the slab mode. Then, it is possible to enlarge the mode pattern by increasing the width W1 of the ridge portion 5 to decrease the optical density. It is proved that the influences of the tipping 22 at the edges of the ridge portion 5 can be thereby reduced and that the propagation loss can be improved as a whole.

Figure 5:
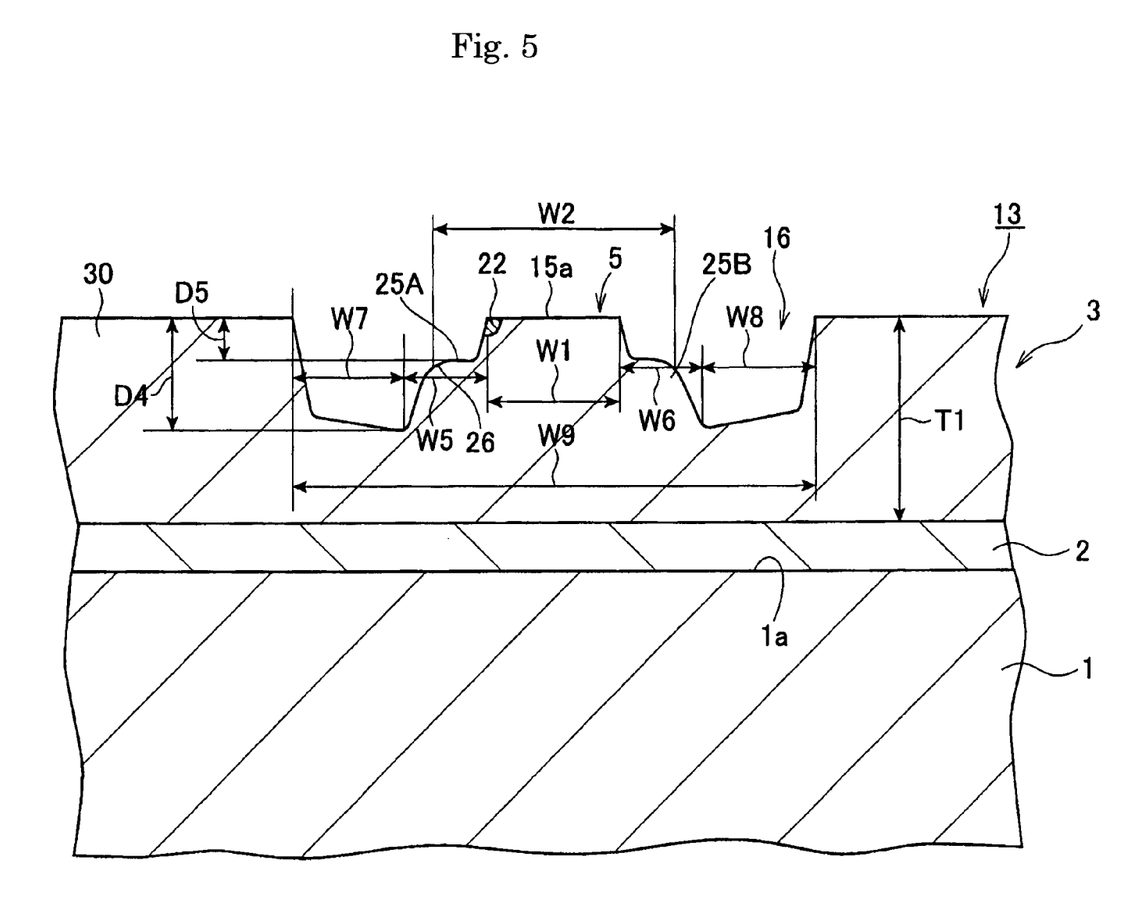
FIG. 5 is a cross sectional view schematically showing an optical waveguide device 13 according to an embodiment of the second invention.

FIG. 5 is a cross sectional view schematically showing a device 13 according to the second invention.

A ferroelectric layer 3 made of a ferroelectric material is adhered to a supporting body 1 through an adhesive layer 2. Buffer layers not shown may be provided on the upper and bottom face sides of the ferroelectric layer 3.

A ridge portion 15 is formed in the ferroelectric layer 3, and a channel type optical waveguide is provided within the ridge portion 15. The optical waveguide is elongated in the direction perpendicular to the paper face in FIG. 5. A first step portion 25A is formed on the left side in the paper face and a second step portion 25B is provided on the right side of the ridge portion 15. Grooves 16 are formed on the outside of the step portions 25A, 25B, respectively, and elongate portions 30 are formed outside of the grooves, respectively. 15a represents an upper face of the ridge portion 15.

According to the respective inventions, the thickness T1 of the ferroelectric layer is made 4 μm or larger and 7 μm or smaller. The present invention is effective in the case that a thin substrate having this range of thickness is used.

According to the respective inventions, the width W1 of the ridge portion is 6.6 μm or larger and 8.5 μm or smaller. By making W1 to 6.6 μm or larger, it is possible to confine light within the ridge portion 5 so that the propagation loss is reduced. On the viewpoint, W1 may preferably be 7.0 μm or larger. Further, in the case that W1 exceeds 8.5 μm, the excitation of single mode becomes difficult and light is propagated in multi mode, so that the propagation loss is increased.

Further, according to the first invention, a distance W2 of the outer edge 10a of the first protuberance 10A and the outer edge 10a of the second protuberance 10B is 8.6 μm or larger and 20 μm or smaller, and the present invention is effective in this range. W2 may preferably be 10 μm or larger and preferably be 18.5 μm or smaller.

According to the first invention, the depth D1 of the inner groove 20 is made 2.0 μm or larger and 2.9 μm or smaller. When D1 is smaller than 2.0 μm, the lateral leakage of light through the inner groove 20 becomes considerable so that the mode size becomes large and the propagation mode tends to be coupled with the slab mode and thus radiated. The propagation loss is thereby lowered. On the viewpoint, D1 may preferably be 2.5 μm or larger. Further, when D1 exceeds 2.9 μm, the influences of the tipping of the ridge portion 5 becomes considerable to result in an increase of the propagation loss due to scattering of light.

According to the first invention, the depth D2 of the outer groove is made 2.5 μm or larger and 3.5 μm or smaller. When D2 is smaller than 2.5 μm, the mode size becomes large and the propagation mode tends to be coupled with the slab mode to result in an increase of the propagation loss. Further, when D2 exceeds 3.5 μm, D1 is also deepened responsive to this and the influences of the tipping of the edges of the ridge portion 5 becomes considerable, resulting in an increase of the propagation loss due to the scattering of light.

According to the first invention, the depth D2 of the outer groove is larger than the depth D1 of the inner groove. It is thus possible to control the influences of the respective modes B1 and B2 appropriately. On the viewpoint, a difference of D2 and D1 may preferably be 0.1 μm or larger and more preferably be 0.5 μm or larger.

Further, a distance W9 between the respective outer edges of the outer grooves 21 may preferably be 12.6 μm or larger and more preferably be 24.5 μm or smaller.

According to second invention, depths D5 of the step portions 25A and 25B are 2.0 μm or larger and 2.9 μm or smaller. When D5 is smaller than 2.0 μm, the mode size tends to be large and the propagation loss tends to be deteriorated. On the viewpoint, D5 may preferably be 2.5 μm or larger. Further, when D5 exceeds 2.9 μm, the influences due to the tipping of the edges of the ridge portion 5 becomes considerable and the propagation loss is increased due to scattering of light.

According to the second invention, the depth D4 of the groove 16 is made 2.5 μm or larger and 3.5 μm or smaller. When D4 is smaller than 2.5 μm, the mode size tends to be large and the propagation loss is deteriorated. Further, when D4 exceeds 3.5 μm, the influences of the tipping at the edges of the ridge portion 5 becomes considerable and the propagation loss is increased due to scattering of light.

A difference of D4 and D5 may preferably be 0.1 μm or larger and more preferably be 0.5 μm or larger.

According to the second invention, if the widths W5 and W6 of the step portions 25A, 25B are too narrow, the effects of the present invention are reduced. On the viewpoint, W5 and W6 may preferably be 1 μm or larger. On the other hand, if W5 and W6 are too wide, the confinement of light is weakened, so that the propagation mode tends to be coupled with the slab mode. On the viewpoint, W5 and W6 may preferably be 6.7 μm or smaller.

According to the second invention, if the widths W7 and W8 of the grooves 16 subtracting the widths of the step portions 25A and 25B are too narrow, the confinement of light is weak and the propagation loss of light becomes large. On the viewpoint, W7 and W8 may preferably be 1 μm or more and more preferably be 2 μm or more.

Further, a distance W9 between outer edges of the outer grooves 21 may preferably be 12.6 μm or larger and more preferably be 24.5 μm or smaller.

According to the respective inventions, it may be provided an upper substrate covering the surface side of the ferroelectric layer. Further, according to the respective inventions, it may be provided an upper-side adhesive layer adhering the ferroelectric layer and upper substrate. By providing the upper substrate, the distribution of optical properties and stress in the direction of thickness of the optical waveguide substrate becomes symmetrical. The device can thus be made stable against outer disturbances such as temperature change or the like.

A method for processing the ferroelectric layer for forming the ridge structure is not limited, and includes machining, ion milling, dry etching, laser ablation or the like.

Various kinds of systems may be used as a grinding system. It is now particularly preferred to use a grinding system called precision micro grinder owing to the high mechanical precision. Further, as a method of precision grinding, it may be applied ELID grinding (a method of grinding with dressing owing to electrolyzation). ELID grinding is a grinding process of subjecting a grinder to grinding work while the dressing is performed owing to electrolyzation, so that the processing performance is improved and stabilized.

Chemical mechanical polishing may be used as a method of finishing by surface grinding.

Alternatively, the machining may be performed by methods such as dicing or the like. According to a preferred embodiment, the groove is formed under the conditions of providing a grinder having a width of 0.1 to 0.2 mm and a mesh number of #200 to 3000 in a dicer, and of operating at a rotational rate of 10000 to 50000 rpm and a feed rate of 50 to 300 mm/min.

Laser ablation is a method of irradiating light of a wavelength or energy comparable with the connection energy between molecules constituting a material to be processed, so that the molecules are dissociated, evaporated and removed. Since this is not a thermal processing, only a laser-irradiated region can be selectively processed without affecting a region surrounding the processed region. It is thus possible to process a ridge structure at a high precision. The "laser ablation" includes the processing owing to multi photon absorption process and includes the case where thermal effect is slightly observed (Pseudo thermal process).

A difference of the wavelength at absorption edge of a material constituting the ferroelectric layer 3 and that of laser beam may preferably be 100 nm or lower and more preferably be 50 nm or lower. According to this method, the groove can be formed by processing, with laser beam having a wavelength of 150 to 300 nm, a mother body composed of lithium niobate, lithium tantalite, a solid solution of lithium niobate-lithium tantalite, $K_3Li_2Nb_5O_{15}$ or $La_3Ga_5SiO_{14}$, for example. As a kind of laser beam for processing, excimer laser, and fourth harmonic wave of Nd-YAG laser etc. may preferably be used.

According to a preferred embodiment, excimer laser is used to form the groove. In this case, laser of a high intensity of 5 to 10 J/cm² per an unit area is directly irradiated to perform rough processing of the substrate 3 to a thickness of about 100 μm and laser of a relatively low intensity of 1 to 4 J/cm² is then used for scanning 10 to 30 times to form the groove. Alternatively, as another method, the substrate 3 is ground and polished to obtain a thin plate, which is then scanned two to three times with laser of a relatively low intensity of 0.5 to 2 J/cm² to form the groove.

The adhesive may be an inorganic adhesive, an organic adhesive or a combination of an inorganic adhesive and an organic adhesive.

Although specific examples of the organic adhesive is not particularly limited, it may be epoxy resin adhesive, a thermosetting resin adhesive, a ultraviolet curable resin adhesive, or "Alon ceramics C" (trade name: Supplied by Toa Gosei Co. Ltd.,) having a thermal expansion coefficient (thermal expansion coefficient of $13\times10^{-6}$/K) near that of an electro-optic single crystal such as lithium niobate.

Further, the inorganic adhesive may preferably have a low dielectric constant and an adhesive temperature (working temperature) of about 600° C. or lower. Further, it is preferable that a sufficiently high adhesive strength can be obtained during the processing. Specifically, it may preferably be a glass having a composition of one or plural elements of silicon oxide, lead oxide, aluminum oxide, magnesium oxide, calcium oxide, boron oxide or the like. Further, another inorganic adhesive includes, for example, tantalum pentoxide, titanium oxide, niobium pentoxide and zinc oxide.

The method of forming the inorganic adhesive layer is not particularly limited and includes sputtering, vapor deposition, spin coating, or sol-gel method.

Further, a sheet of an adhesive may be interposed between the ferroelectric layer 3 and supporting body 1 to join them. Preferably, a sheet of a viscous resin adhesive of a thermosetting, photocuring or photothickening resin is interposed between the bottom face of the ferroelectric layer 3 and the supporting body 1, and the sheet is then cured. Such sheet may appropriate be a resin film having a thickness of 300 μm or smaller.

The material of the supporting body 1 is not particularly limited. According to a preferred embodiment, the minimum value of the thermal expansion coefficient of the supporting body 1 is ⅕ or larger of the minimum value of the thermal expansion coefficient of the ferroelectric layer 3, and the maximum value of the thermal expansion coefficient of the supporting body 1 is 5 times or smaller of the maximum value of the thermal expansion coefficient of the ferroelectric layer 3.

In the case that each of the electro-optic materials forming the ferroelectric layer 3 and supporting body 1 has no anisotropy in thermal expansion coefficient, the minimum and maximum values of the thermal expansion coefficient are the same in each of the ferroelectric layer 3 and supporting body 1. When each of the electro-optic materials forming the ferroelectric layer 3 and supporting body 1 is anisotropic in thermal expansion coefficient, the thermal expansion coefficient may be changed for the respective axes. For example, when the electro-optic material forming the ferroelectric layer 3 is lithium niobate, the thermal expansion coefficients for X axis and Y axis are $16\times10^{-6}$/° C., respectively, which is the maximum value. The thermal expansion coefficient in Z axis is $5\times10^{-6}$/° C., which is the minimum value. Therefore, the minimum value of the thermal expansion coefficient of the supporting body 1 is made $1\times10^{-6}$/° C. or larger, and the maximum value of the thermal expansion coefficient of the supporting body 1 is made $80\times10^{-6}$/° C. or smaller. For example, the thermal expansion coefficient of quartz glass is $0.5\times10^{-6}$/° C. and thus smaller than $1\times10^{-6}$/° C., for example.

On the viewpoint, the minimum value of thermal expansion coefficient of the supporting body 1 may more preferably be ½ or larger of that of the ferroelectric layer 3. Further, the maximum value of thermal expansion coefficient of the supporting body 1 may more preferably be 2 times or smaller of the maximum value of that of the ferroelectric layer 3.

Specific examples of the material of the supporting body 1 are not particularly limited, as far as the above conditions are satisfied. It includes lithium niobate, lithium tantalate, a glass such as quartz glass, quartz, Si or the like. In this case, the materials of the ferroelectric thin layer and the dielectric layer may preferably be the same on the viewpoint of difference of thermal expansion, and most preferably be lithium niobate single crystal.

The material of the upper substrate is not particularly limited, and includes lithium niobate, lithium tantalate, a glass such as quartz glass, quartz, Si or the like. In this case, On the viewpoint of difference of thermal expansion, the supporting body and upper substrate may be made of the same material, and most preferably made of lithium niobate. Further, the upper substrate may be made of a material having a high thermal conductivity such as Si, so that the temperature distribution in the longitudinal direction of the substrate can be made constant and stability of SHG output under high output power operation can be improved.

Although the thickness of the upper substrate is not particularly limited, it may preferably be 100 μm or larger on the viewpoint described above. Further, the upper limit of the thickness of the upper substrate is not particularly defined, the thickness may preferably be 2 mm or smaller on the practical view.

EXAMPLES

Example 1

The device shown in FIG. 2 was produced.

Specifically, a periodic domain inversion structure of a period of 17.6 μm was formed in an MgO-doped lithium niobate substrate with a thickness of 500 μm, which was then adhered onto a non-doped lithium niobate substrate 1 having a thickness of 1 mm. Then, the exposed surface of the MgO-doped lithium niobate substrate was processed by grinding and polishing to a thickness of 5.0 μm to form the ferroelectric layer 3. Then, the ridge portion, protuberances 10A, 10B, inner grooves 20 and outer grooves 21 were formed by laser ablation. The shape of a processing mask for the laser ablation was changed to adjust the respective dimensions. Further, it was produced a device having a length of 45 mm and the both end faces were polished.

Besides, the cross section of the device was observed and the depth, width and thickness were measured by means of a critical dimension microscope.

It was measured the propagation loss of the optical waveguides at a wavelength of 1.56 μm. The thus obtained results were shown in table 1.

TABLE 1

| | T1 (μm) | W1 (μm) | W2 (μm) | D1 (μm) | D2 (μm) | Propagation loss (dB/cm) |
|---|---|---|---|---|---|---|
| A-1 | 5.0 | 5.5 | 17.0 | 2.0 | 3.0 | 2.0 |
| A-2 | 5.0 | 6.5 | 17.0 | 2.0 | 3.0 | 0.8 |

TABLE 1-continued

| | T1 (μm) | W1 (μm) | W2 (μm) | D1 (μm) | D2 (μm) | Propagation loss (dB/cm) |
|---|---|---|---|---|---|---|
| A-3 | 5.0 | 6.6 | 17.0 | 2.0 | 3.0 | 0.2 |
| A-4 | 5.0 | 7.0 | 17.0 | 2.0 | 3.0 | 0.2 |
| A-5 | 5.0 | 8.5 | 17.0 | 2.0 | 3.0 | 0.4 |
| A-6 | 5.0 | 9.0 | 17.0 | 2.0 | 3.0 | 1.0 |
| B-1 | 5.0 | 6.6 | 7.0 | 2.0 | 3.0 | 0.8 |
| B-2 | 5.0 | 6.6 | 8.0 | 2.0 | 3.0 | 0.8 |
| B-3 | 5.0 | 6.6 | 8.6 | 2.0 | 3.0 | 0.4 |
| B-4 | 5.0 | 6.6 | 10.0 | 2.0 | 3.0 | 0.3 |
| B-5 | 5.0 | 6.6 | 20.0 | 2.0 | 3.0 | 0.3 |
| B-6 | 5.0 | 6.6 | 21.0 | 2.0 | 3.0 | 0.8 |
| C-1 | 5.0 | 6.6 | 17.0 | 1.0 | 3.0 | 2.5 |
| C-2 | 5.0 | 6.6 | 17.0 | 1.75 | 3.0 | 1.5 |
| C-3 | 5.0 | 6.6 | 17.0 | 2.5 | 3.0 | 0.3 |
| C-4 | 5.0 | 6.6 | 17.0 | 2.9 | 3.0 | 0.4 |
| C-5 | 5.0 | 6.6 | 17.0 | 3.0 | 3.0 | 1.5 |
| D-1 | 5.0 | 6.6 | 17.0 | 2.0 | 2.2 | 1.0 |
| D-2 | 5.0 | 6.6 | 17.0 | 2.0 | 2.5 | 0.4 |
| D-3 | 5.0 | 6.6 | 17.0 | 2.0 | 3.5 | 0.3 |
| D-4 | 5.0 | 6.6 | 17.0 | 2.0 | 4.0 | 1.5 |

As can be seen from table 1, it is proved that the propagation loss is considerably decreased, by adjusting the width W1 of the ridge portion to 6.6 μm or larger and 8.5 μm or smaller, the distance W2 of the outer edges of the first protuberance and second protuberance to 8.6 μm or larger and 20 μm or smaller, the depth D1 of the inner groove to 2.0 μm or larger and 2.9 μm or smaller and the depth D2 of the outer groove to 2.5 μm or larger and 3.5 μm or smaller.

In particular in A-1 and A-2 where the width W1 of the ridge portion is 6.5 μm or smaller, the propagation loss tends to increase due to the enlargement of the mode size. In the case that W1 exceeds 8.5 μm, the propagation in multi mode becomes predominant and the propagation loss is increased (A-6). Further, the depth D1 of the inner groove is smaller than 2.0 μm (C-1, C-2), the confinement of light becomes weak so that the mode size and propagation loss are increased. When D1 exceeds 2.9 μm (C-5), if the tipping 22 is generated at the edges of the ridge portion, the tipping is large so that the influences of optical scattering becomes considerable and the propagation loss is increased. The similar results are observed as to the depth D2 of the outer groove.

Example 2

The devices were produced according to the same procedure as the Example 1 and the propagation losses were measured. However, the thickness T1 of the ferroelectric layer 3 was made 4.0 μm. The other dimensions were changed as shown in the following table 2. The results were shown in table 2.

TABLE 2

| | T1 (μm) | W1 (μm) | W2 (μm) | D1 (μm) | D2 (μm) | Propagation loss (dB/cm) |
|---|---|---|---|---|---|---|
| E-1 | 4.0 | 5.5 | 17.0 | 2.0 | 3.0 | 2.5 |
| E-2 | 4.0 | 6.5 | 17.0 | 2.0 | 3.0 | 1.0 |
| E-3 | 4.0 | 6.6 | 17.0 | 2.0 | 3.0 | 0.3 |
| E-4 | 4.0 | 7.0 | 17.0 | 2.0 | 3.0 | 0.3 |
| E-5 | 4.0 | 8.5 | 17.0 | 2.0 | 3.0 | 0.4 |
| E-6 | 4.0 | 9.0 | 17.0 | 2.0 | 3.0 | 1.3 |
| E-7 | 4.0 | 6.6 | 7.0 | 2.0 | 3.0 | 1.2 |
| E-8 | 4.0 | 6.6 | 8.0 | 2.0 | 3.0 | 1.0 |
| E-9 | 4.0 | 6.6 | 8.6 | 2.0 | 3.0 | 0.4 |
| E-10 | 4.0 | 6.6 | 10.0 | 2.0 | 3.0 | 0.4 |
| E-11 | 4.0 | 6.6 | 20.0 | 2.0 | 3.0 | 0.4 |
| E-12 | 4.0 | 6.6 | 21.0 | 2.0 | 3.0 | 1.0 |

TABLE 2-continued

| | T1 (μm) | W1 (μm) | W2 (μm) | D1 (μm) | D2 (μm) | Propagation loss (dB/cm) |
|---|---|---|---|---|---|---|
| E-13 | 4.0 | 6.6 | 17.0 | 1.0 | 3.0 | 3.0 |
| E-14 | 4.0 | 6.6 | 17.0 | 1.75 | 3.0 | 2.0 |
| E-15 | 4.0 | 6.6 | 17.0 | 2.5 | 3.0 | 0.4 |
| E-16 | 4.0 | 6.6 | 17.0 | 2.9 | 3.0 | 0.4 |
| E-17 | 4.0 | 6.6 | 17.0 | 3.0 | 3.0 | 1.8 |
| E-18 | 4.0 | 6.6 | 17.0 | 2.0 | 2.2 | 1.2 |
| E-19 | 4.0 | 6.6 | 17.0 | 2.0 | 2.5 | 0.5 |
| E-20 | 4.0 | 6.6 | 17.0 | 2.0 | 3.5 | 0.4 |
| E-21 | 4.0 | 6.6 | 17.0 | 2.0 | 4.0 | 2.0 |

As can be seen from table 2, it was observed tendency similar to that shown in the Example 1.

Example 3

The devices were produced according to the same procedure as the Example 1 and the propagation losses were measured. However, the thickness T1 of the ferroelectric layer 3 was made 7.0 μm. The other dimensions were changed as shown in the following table 3. The results were shown in table 3.

TABLE 3

| | T1 (μm) | W1 (μm) | W2 (μm) | D1 (μm) | D2 (μm) | Propagation loss (dB/cm) |
|---|---|---|---|---|---|---|
| F-1 | 7.0 | 5.5 | 17.0 | 2.0 | 3.0 | 1.9 |
| F-2 | 7.0 | 6.5 | 17.0 | 2.0 | 3.0 | 0.8 |
| F-3 | 7.0 | 6.6 | 17.0 | 2.0 | 3.0 | 0.3 |
| F-4 | 7.0 | 7.0 | 17.0 | 2.0 | 3.0 | 0.3 |
| F-5 | 7.0 | 8.5 | 17.0 | 2.0 | 3.0 | 0.5 |
| F-6 | 7.0 | 9.0 | 17.0 | 2.0 | 3.0 | 1.2 |
| F-7 | 7.0 | 6.6 | 7.0 | 2.0 | 3.0 | 0.8 |
| F-8 | 7.0 | 6.6 | 8.0 | 2.0 | 3.0 | 0.8 |
| F-9 | 7.0 | 6.6 | 8.6 | 2.0 | 3.0 | 0.4 |
| F-10 | 7.0 | 6.6 | 10.0 | 2.0 | 3.0 | 0.4 |
| F-11 | 7.0 | 6.6 | 20.0 | 2.0 | 3.0 | 0.4 |
| F-12 | 7.0 | 6.6 | 21.0 | 2.0 | 3.0 | 1.0 |
| F-13 | 7.0 | 6.6 | 17.0 | 1.0 | 3.0 | 2.0 |
| F-14 | 7.0 | 6.6 | 17.0 | 1.75 | 3.0 | 1.3 |
| F-15 | 7.0 | 6.6 | 17.0 | 2.5 | 3.0 | 0.4 |
| F-16 | 7.0 | 6.6 | 17.0 | 2.9 | 3.0 | 0.5 |
| F-17 | 7.0 | 6.6 | 17.0 | 3.0 | 3.0 | 1.5 |
| F-18 | 7.0 | 6.6 | 17.0 | 2.0 | 2.2 | 1.0 |
| F-19 | 7.0 | 6.6 | 17.0 | 2.0 | 2.5 | 0.5 |
| F-20 | 7.0 | 6.6 | 17.0 | 2.0 | 3.5 | 0.3 |
| F-21 | 7.0 | 6.6 | 17.0 | 2.0 | 4.0 | 1.2 |

As can be seen from table 3, it was observed tendency similar to that shown in the Example 1.

Example 4

The device shown in FIG. 5 was produced.

Specifically, a periodic domain inversion structure of a period of 17.6 μm was formed in an MgO-doped lithium niobate substrate with a thickness of 500 μm, which was then adhered onto a non-dope lithium niobate substrate 1 having a thickness of 1 mm. Then, the exposed surface of the MgO-doped lithium niobate substrate was processed by grinding and polishing to a thickness of 4.0 μm to form the ferroelectric layer 3. Then, the ridge portion, step portions 25A, 25B and grooves 16 were formed by laser ablation. The shape of a processing mask for the laser ablation was changed to adjust the respective dimensions.

It was produced the device having a length of 45 mm and the both end faces were polished. It was measured the propagation loss of the optical waveguides at a wavelength of 1.56 µm. The thus obtained results were shown in table 4.

TABLE 4

|  | T1 (µm) | W1 (µm) | W2 (µm) | D5 (µm) | D4 (µm) | Propagation loss (dB/cm) |
|---|---|---|---|---|---|---|
| G-1 | 4.0 | 5.5 | 17.0 | 2.0 | 3.0 | 2.6 |
| G-2 | 4.0 | 6.5 | 17.0 | 2.0 | 3.0 | 1.0 |
| G-3 | 4.0 | 6.6 | 17.0 | 2.0 | 3.0 | 0.4 |
| G-4 | 4.0 | 7.0 | 17.0 | 2.0 | 3.0 | 0.4 |
| G-5 | 4.0 | 8.5 | 17.0 | 2.0 | 3.0 | 0.5 |
| G-6 | 4.0 | 9.0 | 17.0 | 2.0 | 3.0 | 1.5 |
| G-7 | 4.0 | 6.6 | 7.0 | 2.0 | 3.0 | 1.5 |
| G-8 | 4.0 | 6.6 | 8.0 | 2.0 | 3.0 | 1.0 |
| G-9 | 4.0 | 6.6 | 8.6 | 2.0 | 3.0 | 0.5 |
| G-10 | 4.0 | 6.6 | 10.0 | 2.0 | 3.0 | 0.5 |
| G-11 | 4.0 | 6.6 | 20.0 | 2.0 | 3.0 | 0.5 |
| G-12 | 4.0 | 6.6 | 21.0 | 2.0 | 3.0 | 1.5 |
| G-13 | 4.0 | 6.6 | 17.0 | 1.0 | 3.0 | 2.8 |
| G-14 | 4.0 | 6.6 | 17.0 | 1.75 | 3.0 | 1.8 |
| G-15 | 4.0 | 6.6 | 17.0 | 2.5 | 3.0 | 0.4 |
| G-16 | 4.0 | 6.6 | 17.0 | 2.9 | 3.0 | 0.4 |
| G-17 | 4.0 | 6.6 | 17.0 | 3.0 | 3.0 | 1.8 |
| G-18 | 4.0 | 6.6 | 17.0 | 2.0 | 2.2 | 1.2 |
| G-19 | 4.0 | 6.6 | 17.0 | 2.0 | 2.5 | 0.5 |
| G-20 | 4.0 | 6.6 | 17.0 | 2.0 | 3.5 | 0.4 |
| G-21 | 4.0 | 6.6 | 17.0 | 2.0 | 4.0 | 2.0 |

As can be seen from table 4, it is proved that the propagation loss is considerably decreased, by adjusting the width W1 of the ridge portion to 6.6 µm or larger and 8.5 µm or smaller, the distance W2 of the outer edges of the first step portion and the second step portion to 8.6 µm or larger and 20 µm or smaller, the depth D5 of the step portion to 2.0 µm or larger and 2.9 µm or smaller, and the depth D4 of the groove to 2.5 µm or larger and 3.5 µm or smaller.

Example 5

The devices were produced according to the same procedure as the Example 4 and the propagation losses were measured. However, the thickness T1 of the ferroelectric layer 3 was made 7.0 µm. The other dimensions were changed as shown in the following table 5. The results were shown in table 5.

TABLE 5

|  | T1 (µm) | W1 (µm) | W2 (µm) | D5 (µm) | D4 (µm) | Propagation loss (dB/cm) |
|---|---|---|---|---|---|---|
| H-1 | 7.0 | 5.5 | 17.0 | 2.0 | 3.0 | 1.8 |
| H-2 | 7.0 | 6.5 | 17.0 | 2.0 | 3.0 | 1.0 |
| H-3 | 7.0 | 6.6 | 17.0 | 2.0 | 3.0 | 0.4 |
| H-4 | 7.0 | 7.0 | 17.0 | 2.0 | 3.0 | 0.4 |
| H-5 | 7.0 | 8.5 | 17.0 | 2.0 | 3.0 | 0.5 |
| H-6 | 7.0 | 9.0 | 17.0 | 2.0 | 3.0 | 1.2 |
| H-7 | 7.0 | 6.6 | 7.0 | 2.0 | 3.0 | 0.9 |
| H-8 | 7.0 | 6.6 | 8.0 | 2.0 | 3.0 | 0.9 |
| H-9 | 7.0 | 6.6 | 8.6 | 2.0 | 3.0 | 0.4 |
| H-10 | 7.0 | 6.6 | 10.0 | 2.0 | 3.0 | 0.4 |
| H-11 | 7.0 | 6.6 | 20.0 | 2.0 | 3.0 | 0.5 |
| H-12 | 7.0 | 6.6 | 21.0 | 2.0 | 3.0 | 1.0 |
| H-13 | 7.0 | 6.6 | 17.0 | 1.0 | 3.0 | 2.0 |
| H-14 | 7.0 | 6.6 | 17.0 | 1.75 | 3.0 | 1.3 |
| H-15 | 7.0 | 6.6 | 17.0 | 2.5 | 3.0 | 0.4 |
| H-16 | 7.0 | 6.6 | 17.0 | 2.9 | 3.0 | 0.5 |
| H-17 | 7.0 | 6.6 | 17.0 | 3.0 | 3.0 | 1.5 |
| H-18 | 7.0 | 6.6 | 17.0 | 2.0 | 2.2 | 1.0 |
| H-19 | 7.0 | 6.6 | 17.0 | 2.0 | 2.5 | 0.5 |
| H-20 | 7.0 | 6.6 | 17.0 | 2.0 | 3.5 | 0.3 |
| H-21 | 7.0 | 6.6 | 17.0 | 2.0 | 4.0 | 1.3 |

As can be seen from table 5, it was observed tendency similar to that shown in the Example 4.

(Description of reference numerals)

| | |
|---|---|
| 1 | Supporting body |
| 2 | Adhesive layer |
| 3 | Ferroelectric layer |
| 5, 15 | Ridge portion |
| 10A | First protuberance |
| 10B | Second protuberance |
| 10a | Outer edge of protuberance |
| 12, 13 | Optical waveguide device |
| 20 | Inner groove |
| 21 | Outer groove |
| 22 | Tipping |
| 25A | First step portion |
| 25B | Second step portion |
| 26 | Outer edge of step portion |
| 30 | Extended portion |
| D1 | Depth of inner groove |
| D2 | Depth of outer groove |
| D4 | Depth of groove |
| D5 | Depth of step potion |
| W1 | Edge of ridge portion |
| W2 | Distance of outer edges of first protuberance (step portion) and second protuberance (step portion) |

The invention claimed is:

1. An optical waveguide device comprising:
a ferroelectric layer comprising a ferroelectric material and having a thickness of 4 µm or more and 7 µm or less; a supporting body; and an adhesive layer adhering a bottom face of said ferroelectric layer and said supporting body, wherein said ferroelectric layer comprises a ridge portion comprising a channel type optical waveguide formed therein, a first protuberance provided on a first side of said ridge portion, and a second protuberance provided on a second side of said ridge portion, wherein inner grooves are formed between said ridge portion and said protuberances, respectively; wherein outer grooves are formed outside of said protuberances, respectively; wherein said outer grooves are deeper than said inner grooves; wherein said ridge portion has a width W1 of 6.6 µm or larger and 8.5 µm or smaller; wherein a distance W2 of an outer edge of said first protuberance and an outer edge of said second protuberance is 8.6 µm or larger and 20 µm or smaller;
wherein said inner grooves have a depth D1 of 2.0 µm or larger and 2.9 µm or smaller; and wherein said outer grooves have a depth D2 of 2.5 µm or larger and 3.5 µm or smaller.

2. The optical waveguide device of claim 1, wherein said adhesive layer comprises an inorganic adhesive contacting said ferroelectric layer.

3. The optical waveguide device of claim 1, wherein said ferroelectric material comprises lithium niobate, lithium tantalate, lithium niobate-lithium tantalate solid solution, $K_3Li_2Nb_5O_{15}$ or $La_3Ga_5SiO_{14}$.

4. The optical waveguide device of claim 1, wherein said inner grooves and said outer grooves are formed by laser ablation.

5. A harmonic wave generating device, comprising said optical waveguide device of claim 1 and a periodic domain inversion structure formed in said ridge portion.

6. An optical waveguide device comprising:
a ferroelectric layer comprising a ferroelectric material and having a thickness of 4 µm or more and 7 µm or less;
a supporting body; and
an adhesive layer adhering a bottom face of said ferroelectric layer and said supporting body, wherein said ferroelectric layer comprises a ridge portion comprising a channel type optical waveguide formed therein, a first step portion provided on a first side of said ridge portion and having a height smaller than that of said ridge portion, and a second step portion provided on a second side of said ridge portion and having a height smaller than that of said ridge portion, wherein grooves are formed in outside of said step portions, respectively;

wherein said ridge portion has a width W1 of 6.6 μm or larger and 8.5 μm or smaller;

wherein a distance W2 of an outer edge of said first step portion and an outer edge of said second step portion is 8.6 μm or larger and 20 μm or smaller;

wherein said step portion has a depth D5 of 2.0 μm or larger and 2.9 μm or smaller; and wherein said groove has a depth D4 of 2.5 μm or larger and 3.5 μm or smaller.

7. The optical waveguide device of claim 6, wherein said adhesive layer comprises an inorganic adhesive contacting said ferroelectric layer.

8. The optical waveguide device of claim 6, wherein said ferroelectric material comprises lithium niobate, lithium tantalate, lithium niobate-lithium tantalate solid solution, $K_3Li_2Nb_5O_{15}$ or $La_3Ga_5SiO_{14}$.

9. The optical waveguide device of claim 6, wherein said grooves and said step portions are formed by laser ablation.

10. A harmonic wave generating device, comprising said optical waveguide device of claim 6 and a periodic domain inversion structure formed in said ridge portion.

* * * * *